United States Patent [19]
Tilley

[11] Patent Number: 5,882,163
[45] Date of Patent: *Mar. 16, 1999

[54] FRONT-END BIG BALE LOADER

[76] Inventor: Martin C. Tilley, 4775 N. 1115 E., Buhl, Id. 83316

[ * ] Notice: The term of this patent shall not extend beyond the expiration date of Pat. No. 5,647,716.

[21] Appl. No.: 895,285

[22] Filed: Jul. 15, 1997

Related U.S. Application Data

[63] Continuation of Ser. No. 571,738, Dec. 13, 1995, Pat. No. 5,647,716.

[51] Int. Cl.⁶ ..................................................... A01D 90/08
[52] U.S. Cl. ........................ 414/111; 414/553; 414/789.7; 414/812
[58] Field of Search ................... 414/24.5, 111, 414/551, 553, 554, 721, 789.7, 812

[56]        References Cited

U.S. PATENT DOCUMENTS

| 3,487,955 | 1/1970 | Brown | 414/111 X |
|---|---|---|---|
| 4,084,707 | 4/1978 | McFarland | 414/721 X |
| 4,630,986 | 12/1986 | Taylor | 414/789.7 X |
| 4,634,336 | 1/1987 | Pearce | 414/546 |
| 4,789,289 | 12/1988 | Wilson | 414/111 X |
| 4,952,111 | 8/1990 | Callahan | 414/789.7 X |
| 4,971,504 | 11/1990 | Klompien | 414/111 |
| 5,150,999 | 9/1992 | Dugan | 414/24.5 |
| 5,320,472 | 6/1994 | Matlack et al. | 414/111 |
| 5,397,208 | 3/1995 | Siebenga | 414/111 |

FOREIGN PATENT DOCUMENTS

WO86/07234  12/1986  WIPO.

Primary Examiner—Janice L. Krizek
Attorney, Agent, or Firm—Ken J. Pedersen; Barbara S. Pedersen

[57]            ABSTRACT

A front-end big bale loader is shown and described. A tined pick-up mechanism is pivotally connected to near the front end of a transporting vehicle frame. The tines of the pick-up mechanism are first inserted into the front side of a large bale, and then, the hydraulic system for the pick-up mechanism is actuated to rotate and lift the mechanism up and over the front of the transporting vehicle, to a bed that receives the bale. After the first big bale is rotated and lifted all the way back to the bed, the bale is removed from the tines by a backward shift mechanism that shifts the bale backwards on the bed, away from the temporarily stationary tines. Then, the pick-up mechanism is rotated forward and down in front of the vehicle to be ready to pick up a second big bale. At about the same time, a forward shift mechanism moves the first big hay bale forward again so that the second bale, when it is lifted up and back by the pick-up mechanism, comes to rest on top of the first bale. Then, the two-bale stack on the vehicle bed may be moved back by the backward shift mechanism to leave room on the bed for receiving the next two-bale stack which is created in the same manner.

20 Claims, 8 Drawing Sheets

FRONT-END BIG BALE LOADER

This application is a continuation of, and claims priority from, U.S. patent application Ser. No. 08/571,738, entitled TINED, FRONT-END BIG BALE LOADER, filed on Dec. 13, 1995, issuing as U.S. Pat. No. 5,647,716 on Jul. 15, 1997.

BACKGROUND OF THE INVENTION

1. Field of the Invention

This invention relates generally to hay harvesting and storage. More particularly, this invention relates to machinery for picking up large hay bales from the field, for transporting the bales to a storage area, and for unloading the bales there in a compact, secure stack.

2. Related Art.

To obtain the maximum production from a field of hay, each crop of hay must be promptly cut, baled and removed from the field. The more quickly hay can be cut and removed, the more quickly a successive crop of hay can be cultivated.

The harvesting of hay involves three main tasks: cutting the hay; baling the hay; and removing and storing the baled hay in stacks. Although originally manual tasks, nowadays these tasks to a great extent have been mechanized. Of these three tasks, the removing and stacking of the hay bales has heretofore been the most cumbersome.

The difficulties involved in removing and stacking hay bales are to a great extent dependant on the size and quantity of the individual bales produced by the specific hay baler that is used. Until recently, hay balers have come in three common sizes, producing the following sizes of bales: (1) 14" by 16" by 3 or 4 feet long; (2) 16" by 18" by 3 or 4 feet long; and (3) 16" by 24" by 4 feet long. These three sizes, collectively, fall into the category of "small bales". More recently, balers capable of producing bales 8 feet in length and having cross sections of 2 by 3 feet, 3 by 4 feet, or 4 by 4 feet, known as "big bales", have been produced. The larger bales mean less time is spent gathering, stacking and moving the bales. The primary factor limiting the use of "big bale" balers is the lack of effective machines designed to pick up, transport, stack and retrieve the big bales.

The most common prior art method for moving big bales from the field to a storage area is to use a tractor with a front end loader for loading the bales on a flatbed truck or trailer. Such a method is time consuming and requires at least two operators, i.e., one for each piece of equipment.

U.S. Pat. No. 4,634,336 (Pearce) discloses a front-end bale loader with a platform carrying a pair of pivoted tines, which tines extend along the ground to engage beneath a bale. The tines may be rotated up to lift the bale off the ground, and the platform lifted and rotated to lift, and then discharge the bale.

U.S. Pat. No. 4,971,504 (Klompien) also discloses a front-end bale loader, but with a folding loading cradle pivotally connected to the front of the loader frame.

U.S. Pat. No. 5,397,208 (Siebenga) discloses a front-end bale loader which clamps bales between pick-up arms on the sides of a loading platform. Then, the loading platform pivots to lift the bales onto a downwardly and rearwardly inclined accumulating platform for storing the bales. One or two bales may be lifted at a time.

International Publication No. WO/86/07234 (Nygard et al.) also discloses a front-end bale loader which lifts the bales with a lift fork. This device may also load one or two bales at a time.

SUMMARY OF THE INVENTION

This invention is a front-end big bale loader. A tined pick-up mechanism is pivotally connected to near the front end of a transporting vehicle. The pick-up mechanism preferably has a hydraulically-activated lift arm pivotally connected to a mount that is connected to the vehicle. At its distal end, the lift arm pivotally connects to a horizontal bar. Extending out from the bar in the direction of the vehicle travel is a plurality of sharpened tines for insertion into the sides of the bales. The tines of the pick-up mechanism are first inserted into the front side of a large bale which is lying cross-wise in front of the vehicle. This engagement secures the bale to the pick-up mechanism. Then, the hydraulic system for the pick-up mechanism is actuated to rotate vertically and lift the mechanism up and over the front of the transporting vehicle, from in front of to in back of the vehicle cab, where there is a bed for receiving the bale.

After the first big bale is rotated and lifted all the way back to the bed of the transporting vehicle, the bale is removed from the tines by a backward shift mechanism on or in the bed of the vehicle. The backward shift mechanism removes the bale from the tines by shifting the bale backwards on the bed, away from the temporarily stationary tines. Then, the pick-up mechanism is rotated forward and down again in front of the vehicle to be ready to pick up a second big bale. At about the same time, a forward shift mechanism, also on or in the bed of the vehicle, moves the first big hay bale forward again so that the second bale, when it is lifted up and back by the pick-up mechanism, comes to rest on top of the first bale. Then, the two-bale stack on the vehicle bed may be moved back by the backward shift mechanism to leave room on the bed for receiving the next two-bale stack which is created in the same manner. This way, the vehicle bed may be filled with two-bale stacks. Then, the vehicle transports the load of two-bale stacks to a storage area where the bed is unloaded by tipping it backwards to deposit the stacks on the ground.

DESCRIPTION OF THE PREFERRED EMBODIMENTS

Figure 1:
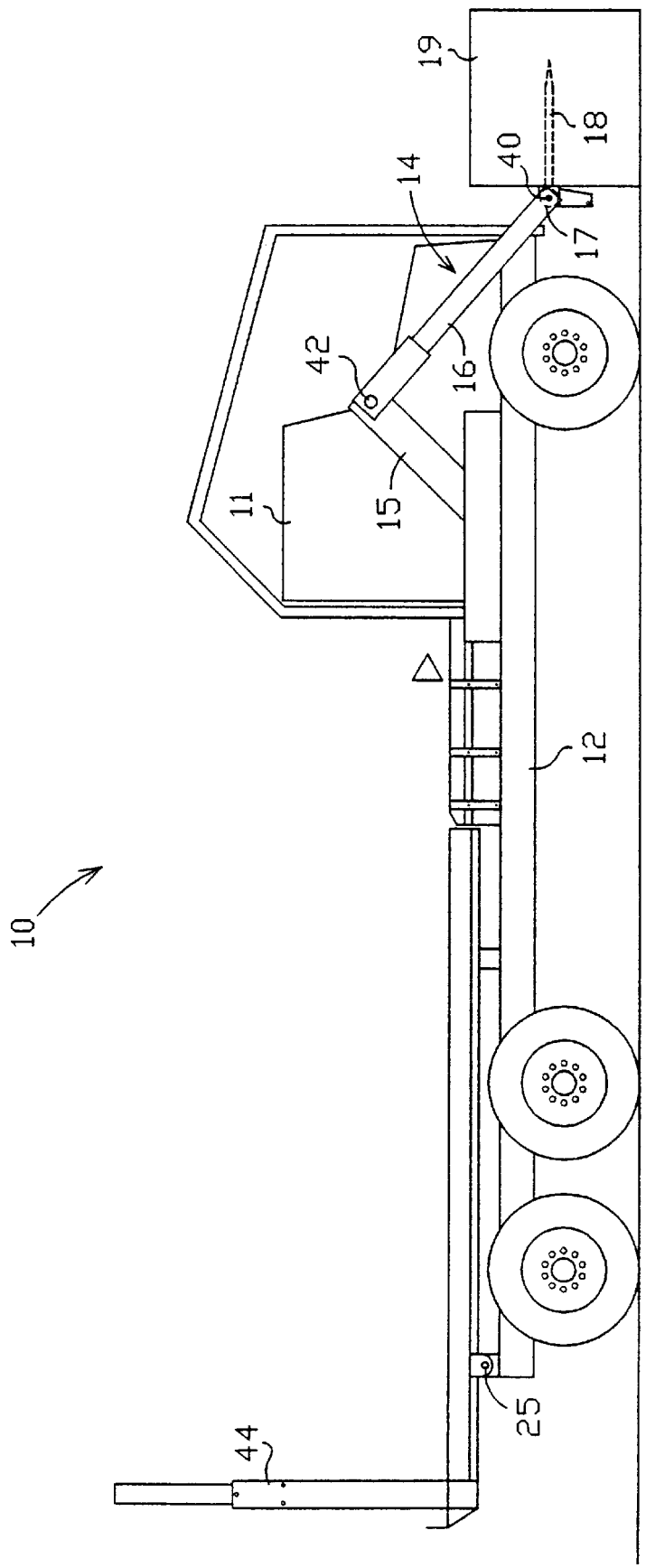
FIG. 1 is a side schematic view of one embodiment of the invention with the pick-up mechanism being lowered to engage a first big bale.

Referring to FIG. 1, there is depicted generally one embodiment 10 of the invention. The big bale loader 10 is preferably connected to a vehicle having a vehicle cab 11 and vehicle frame 12. Thus, the preferable loader 10 is connected on top of the frame 12 of a self-propelled and self-powered vehicle. Near the front end of the vehicle is a pick-up mechanism mount 15 onto which a tined pick-up mechanism 14 is attached. The mount 15 may be, for example, an integral extension of the vehicle frame, but preferably is a part of the loader 10, which is preferably connected by bolts or other means to the vehicle or vehicle frame. The pick-up mechanism comprises lift arm 16 and a tine assembly, which comprises horizontal bar 17 and tine(s) 18. The tine(s) 18, which may be one or more in number, are rigidly connected to horizontal bar 17. Lift arm 16 is pivotally connected to mount 15 and pivotally connected to the horizontal bar 17 of the tine assembly. Preferably, there is one lift arm on the right side of the vehicle cab 11, but optionally there could be a plurality of arms. The preferred, single lift arm 16 on the passenger side allows for exit and entrance through the left side door regardless of the position of the pickup mechanism 14.

Relative motion of the pick-up mechanism components is made possible by conventional hydraulic operators (not shown), for example, or other means. In operation, tine(s) 18 are imbedded in the front side of first bale 19, which bale 19 is lying cross-wise on the ground in front of the vehicle, with the long dimension of the bale perpendicular to the direction of vehicle travel. The tine(s) 18 are generally straight and elongated with sharpened or pointed tips, having a length preferably, but not necessarily, greater than half of the width of the bale 19, so that the bale 19 is securely held by the tine(s) 18 during lifting and rotation.

Figure 2:
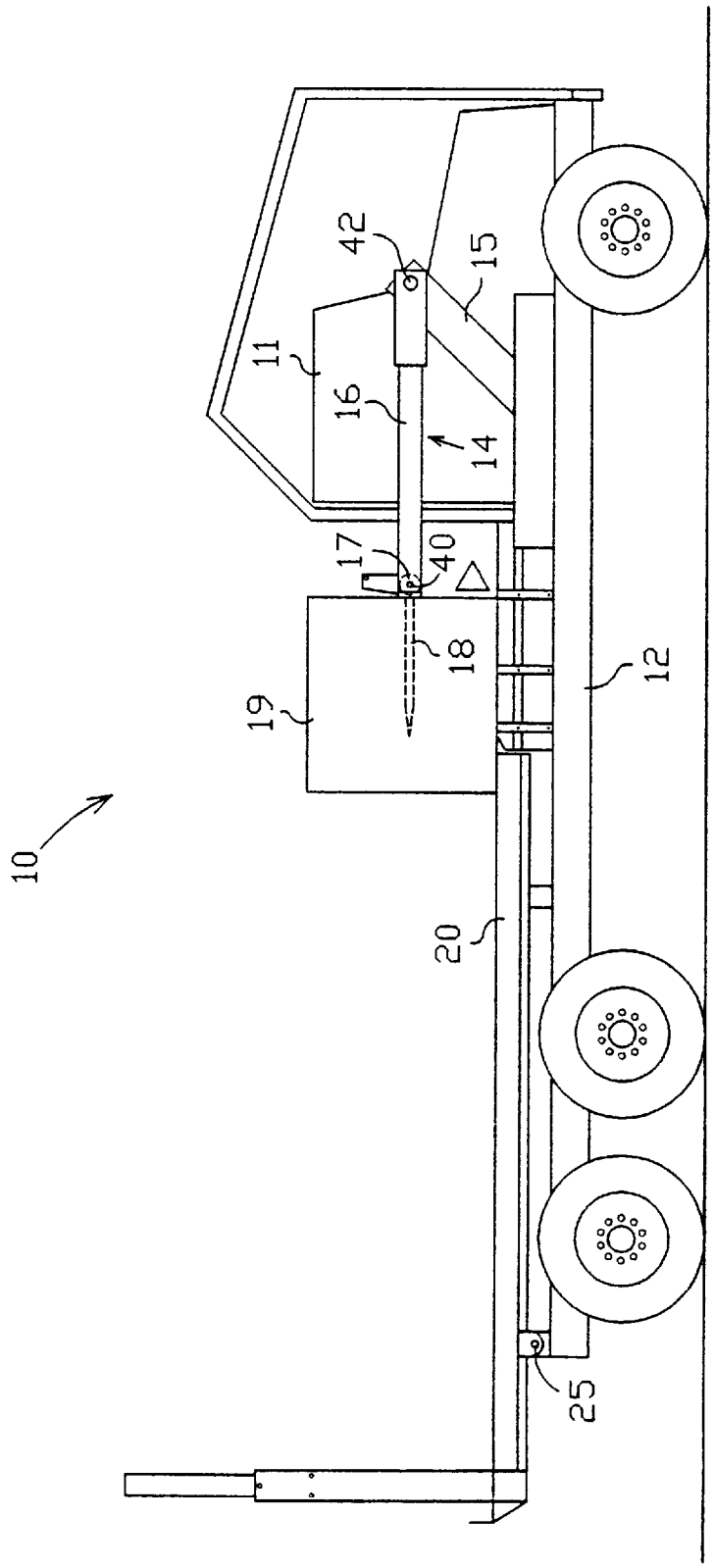
FIG. 2 is the view of FIG. 1, but with the pick-up mechanism being rotated back to deposit the first big bale on the bed of the vehicle.

In FIG. 2, lift arm 16 and pick-up mechanism 14 have been rotated up and back to deposit first big bale 19 on the vehicle bed 20. In doing so, both pivotal joints 40 and 42 have pivoted to place the first bale 19 and the tine(s) 18 generally parallel to the bed 20. The first joint 40 pivots approximately 40 degrees and the second joint 42 pivots more than 180 degrees, typically approximately 220 degrees. Bed 20 needs to be strong enough to support the load of many heavy bales, yet smooth enough to allow the bales to be moved along the bed easily. Bed 20 pivots vertically up and backwards around pivot 25 for unloading of the bales. Also, bed 20 has backward shift mechanism 21 and forward shift mechanism 22 associated with it, that is, preferably on it or in it. For example, these shift mechanisms may be bar members 50 such as bars or pipes pulled by power chains (pulling means 52) on the top surface of bed 20, or tabs moved longitudinally along the bed by a hydraulic actuator in bed 20. By "tab" is meant a member that protrudes up from the bed or from a slot in the bed to extend part of the way up the side of a bale.

Figure 3:
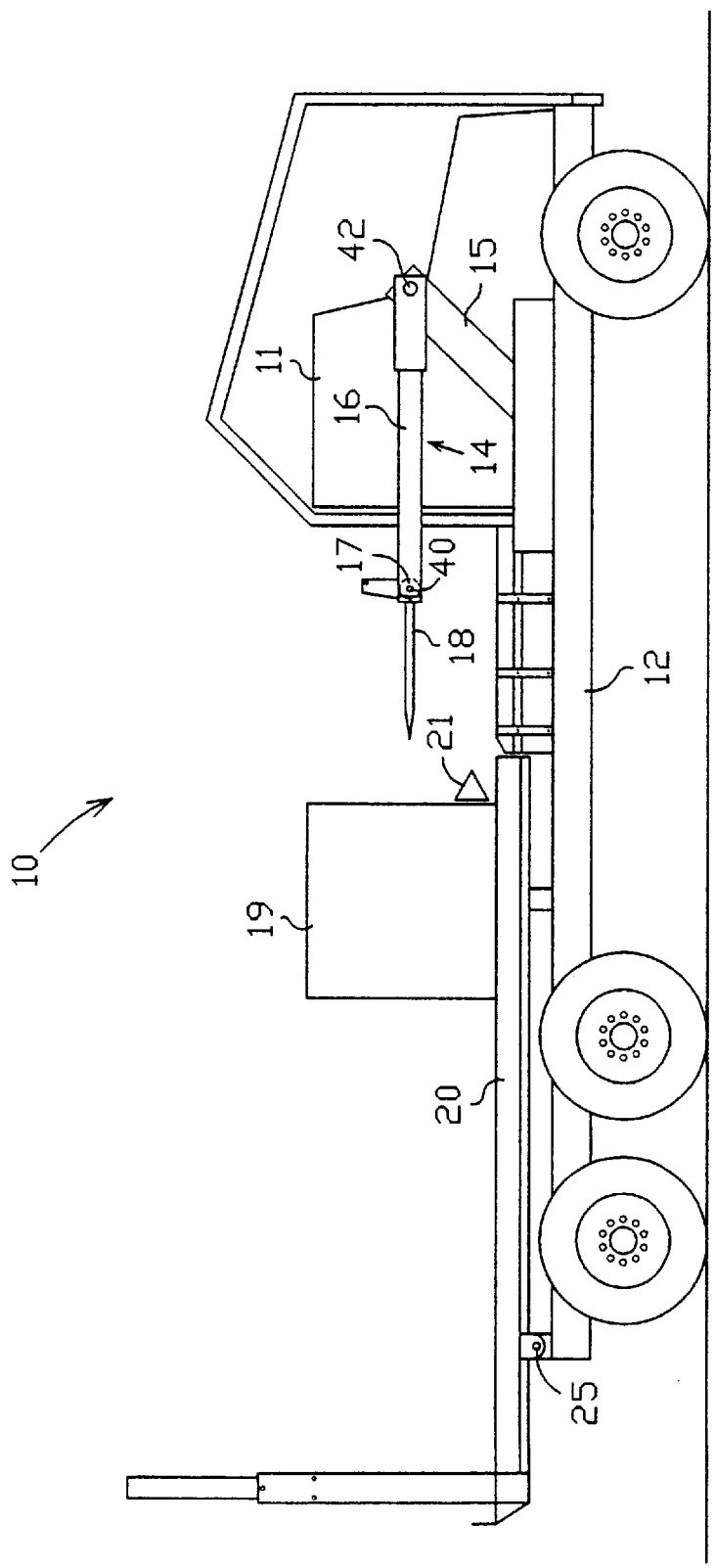
FIG. 3 is the view of FIG. 2, but with the backward shift mechanism being actuated to remove the first big bale from the tines of the pick-up mechanism.

In FIG. 3, backward shift mechanism 21 has been engaged to push big bale 19 backwards on bed 20, and to remove it from tine(s) 18.

Figure 4:
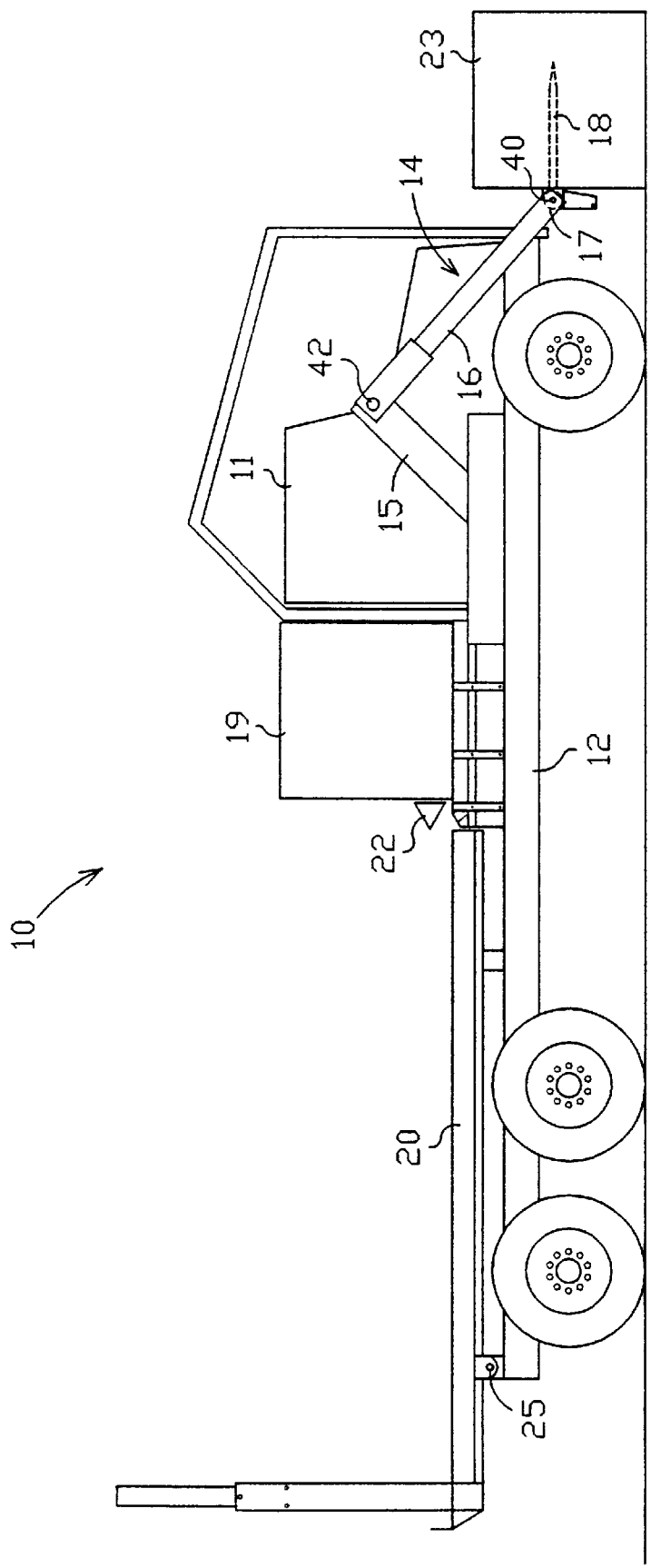
FIG. 4 is the view of FIG. 3, but with the forward shift mechanism being actuated to return the removed first bale forward to where a second bale may be placed on top of the first bale, and with the second big bale being engaged by the pick-up mechanism.
Figure 5:
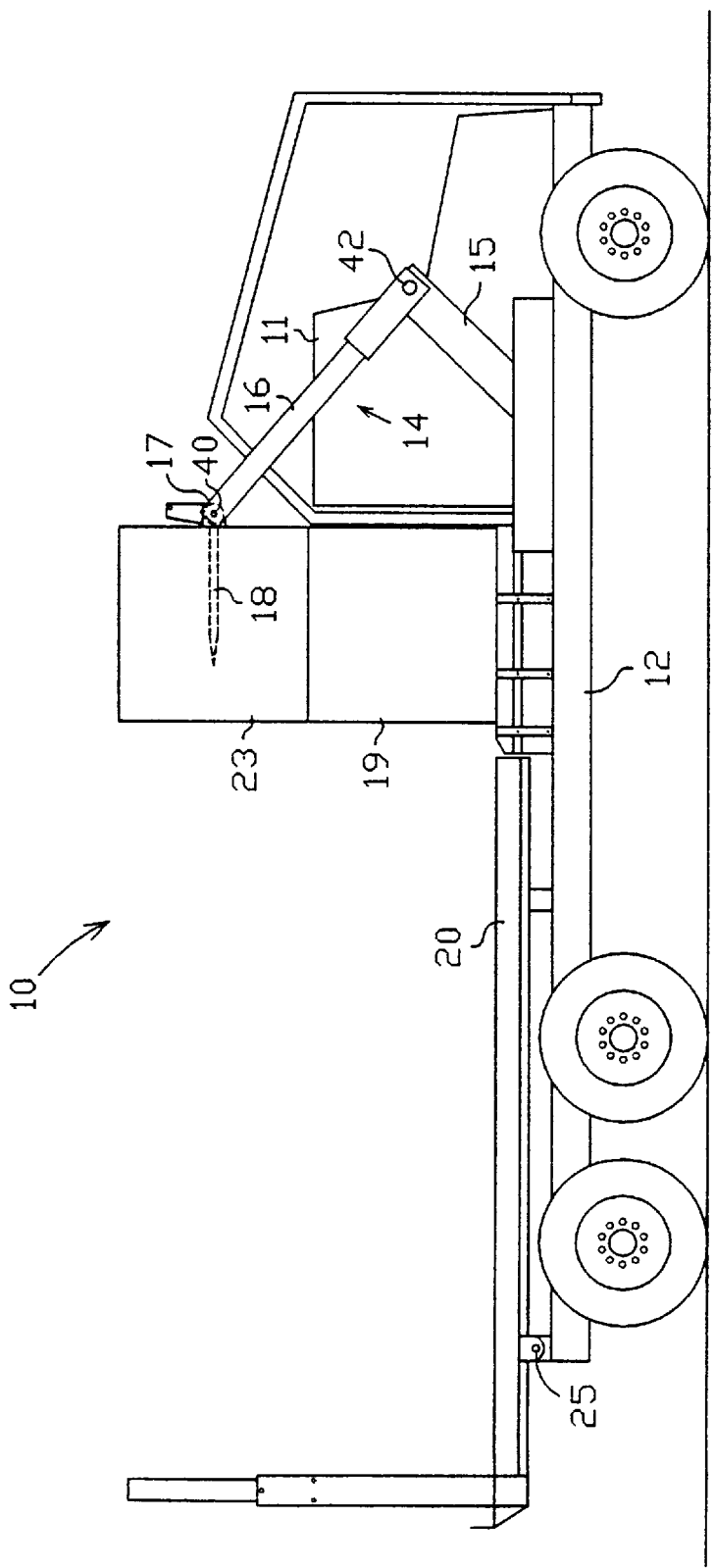
FIG. 5 is the view of FIG. 4, but with the second big bale being placed on top of the first big bale by the pick-up mechanism.

In FIG. 4, forward shift mechanism 22 has been engaged to push big bale 19 forward on bed 20 preferably past where bale 19 was first placed by pick-up mechanism 14 to a location that allows the later accurate alignment (as shown in FIG. 5) of the second bale 23 on top of the first bale 19 by the pick-up mechanism 14. Also in FIG. 4, lift arm 16 and pick-up mechanism 14 have also been rotated forward and down again to engage second big bale 23, by causing both pivoting joints 40, 42 to pivot again to the positions shown in FIGS. 1 and 4.

In FIG. 5, lift arm 16 and pick-up mechanism 14 have been rotated up and back to deposit second big bale 23 on top of first big bale 19. In doing so, the joint 40 between the tine assembly and the lift arm 16 stays generally motionless and the joint between the lift arm 16 and the mount 15 pivots approximately 180 degrees to place the second bale 23 directly and well-aligned on top of the first bale 19. Because of the two pivotal joints, the pick-up mechanism is capable of lifting and depositing bales in both the bottom and top positions in a two-bale stack behind a vehicle cab. When depositing the bales, the pick-up mechanism places each bale in a horizontal, turned-over position, with the side that was facing upward in the field now facing downward toward the bed 20.

Figure 6:
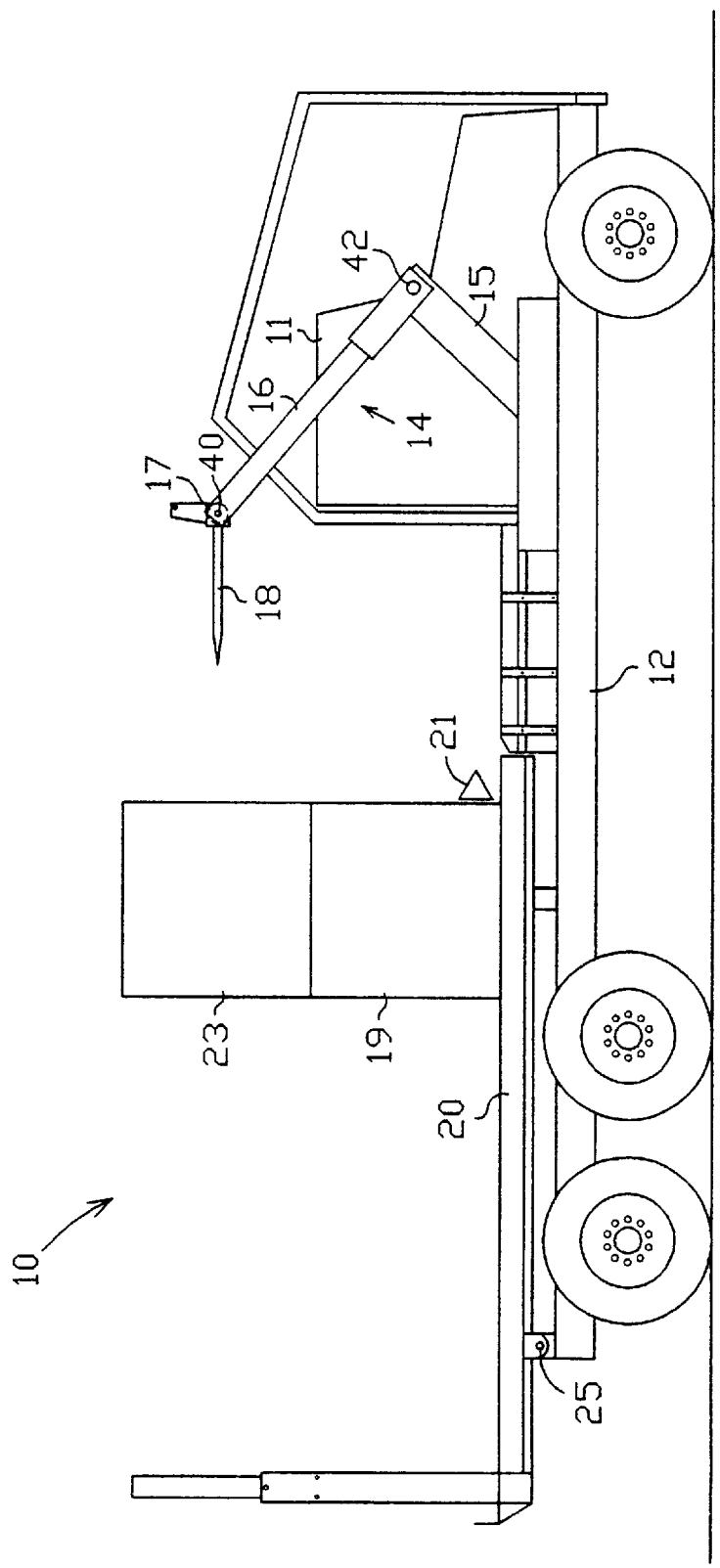
FIG. 6 is the view of FIG. 5, but with the backward shift mechanism being actuated to move the two-bale stack of the first and second bales backward, and remove the second bale from the tines of the pick-up mechanism.

In FIG. 6, backward shift mechanism 21 has been engaged to drag the two-tier stack of big bales 19 and 23 backwards on bed 20, and to remove second big bale 23 from tine(s) 18, thus completing the formation of a two-tier stack generally perpendicular to the bed 20 and vehicle frame.

Figure 7:
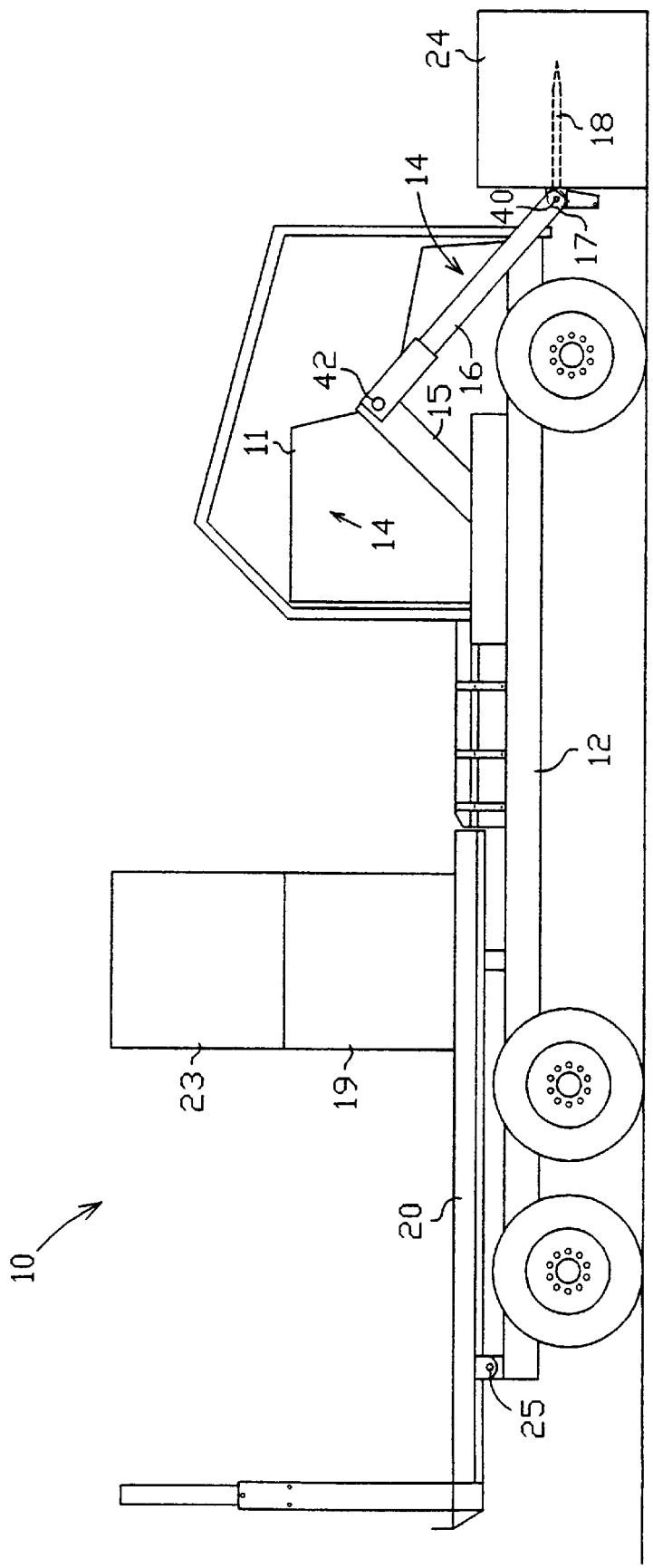
FIG. 7 is the view of FIG. 6, but with the pick-up mechanism being lowered to engage a third big bale.
Figure 8:
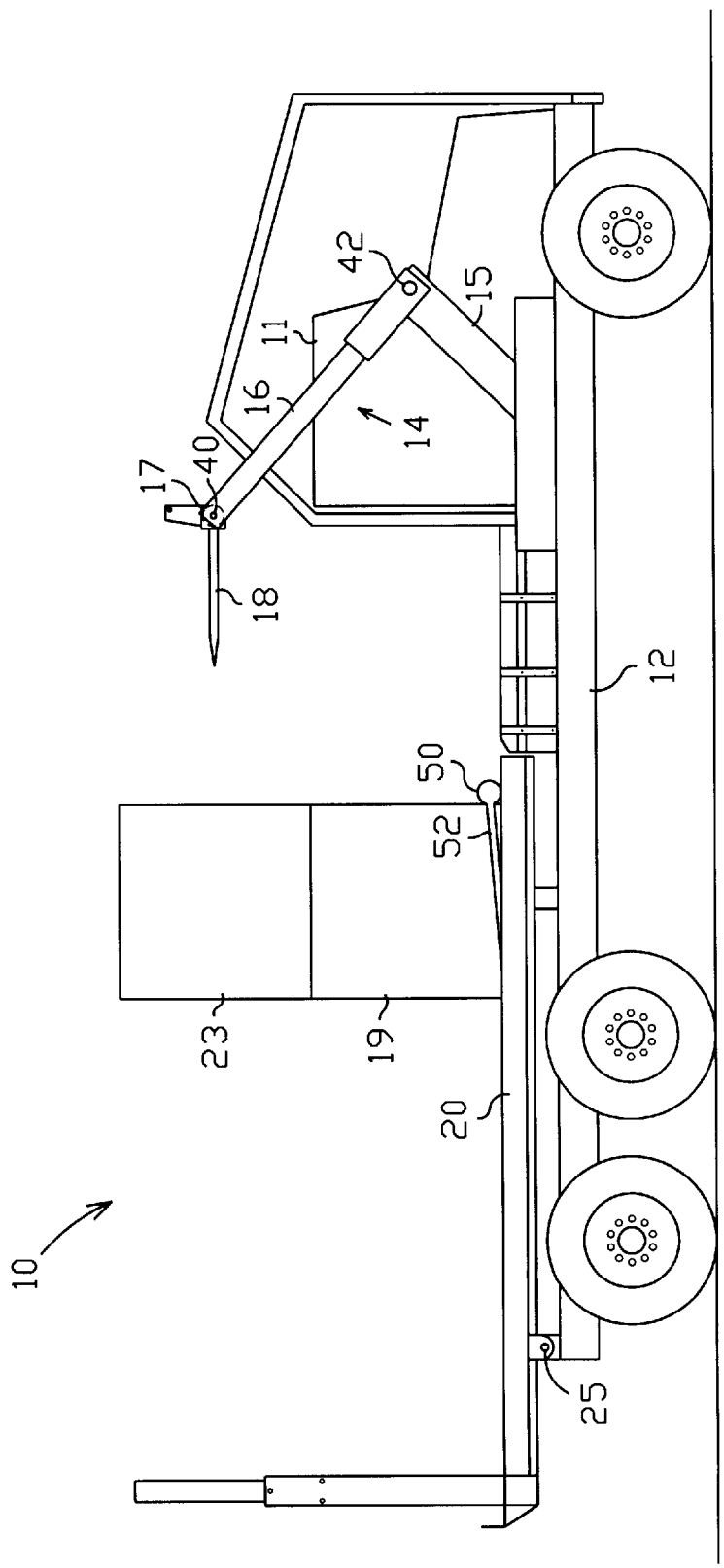
FIG. 8 is a view of the embodiment of FIG. 6, with backward shift mechanism comprising a bar member pulled by power chains.

In FIG. 7, lift arm 16 and pick-up mechanism 14 have been rotated forward and down to engage third big bale 24. When the third big bale 24 is deposited on the bed 20 and backward shift mechanism 21 has been engaged to drag the third big bale 24 backward and off of the tine(s) 18, the third big bale 24 pushes the previously-loaded two-bale stack of bales 19 and 23 backward also. Then, third big bale 24 is pushed forward by the forward shift mechanism 22 and a fourth bale is picked-up and rotated back to rest on the third big bale 24. The backward shift mechanism 21 then shifts this second two-tier stack backward, resulting in the second two-tier stack forcing the previously-loaded two-tier stack backwards also. The process of loading one big bale at a time to create two-bale stacks is repeated then, until bed 20 is full of two-tier stacks of big bales. Then, the transporting vehicle drives the load of bales to a storage location, and bed 20 tips up and backwards around pivot 25, to pivot the bed of bales from a generally horizontal position near the middle of the vehicle to a vertical position near the back of the vehicle, supported by rear load support 44. This pivoting around pivot 25 places the two-tier bale stacks on the ground and unloads the load of bales, so that the empty big bale loader vehicle may move away.

Although this invention has been described above with reference to particular means, materials and embodiments, it is to be understood that the invention is not limited to these disclosed particulars, but extends instead to all equivalents within the scope of the following claims.

I claim:

1. A front-end, big bale loader for use with a vehicle with a front end and back end, said loader comprising:

a pick-up mechanism pivotally connected to the vehicle near the vehicle's front end, and being adapted to pick up a bale and to rotate vertically from near the front end of the vehicle toward the back end of the vehicle; and a bed also pivotally connected to said vehicle near the back end of the vehicle, said bed also being adapted to rotate vertically from being near the middle of the vehicle towards the back end; and said bed having disposed thereon both a backward shift mechanism and a forward shift mechanism for moving single bales and multiple bale stacks upon said bed, the backward shift mechanism comprising a tab extending up from the bed and adapted to push bales longitudinally backward on the bed.

2. A loader as set forth in claim 1, wherein said pick-up mechanism comprises a plurality of pivotal joints.

3. A loader as set forth in claim 1, wherein said pick-up mechanism comprises only two pivotal joints.

4. A loader as set forth in claim 1, wherein said pick-up mechanism comprises a pivotal joint adapted to pivot greater than 180 degrees to rotate the pick-up mechanism from near the front end of the vehicle toward the back end of the vehicle.

5. A loader as set forth in claim 1, wherein said pick-up mechanism comprises a pivotal joint adapted to pivot about 220 degrees to rotate the pick-up mechanism from near the front end of the vehicle toward the back end of the vehicle.

6. A loader as set forth in claim 1, wherein said pick-up mechanism further comprises a lift arm pivotally connected to said vehicle, and said lift arm is adapted to pivot greater than 180 degrees to rotate the pick-up mechanism from near the front end of the vehicle toward the back end of the vehicle.

7. A loader as set forth in claim 1, wherein said pick-up mechanism further comprises a lift arm pivotally connected to said vehicle, and said lift arm is adapted to pivot about 220 degrees to rotate the pick-up mechanism from near the front end of the vehicle toward the back end of the vehicle.

8. A loader as set forth in claim 1, wherein said forward shift mechanism comprises a tab extending up from the bed and adapted to push bales longitudinally forward on the bed.

9. A front-end, big bale loader for use with a vehicle with a front end and back end, said loader comprising:

a pick-up mechanism pivotally connected to the vehicle near the vehicle's front end, and being adapted to pick up a bale and to rotate vertically from near the front end of the vehicle toward the back end of the vehicle; and a bed also pivotally connected to said vehicle near the back end of the vehicle, said bed also being adapted to rotate vertically from being near the middle of the vehicle towards the back end; said bed having a top surface and having disposed thereon both a backward shift mechanism and a forward shift mechanism for moving single bales and multiple-bale stacks upon said bed, the backward shift mechanism comprising a bar member and a means for pulling the bar member longitudinally backward along the top surface of the bed.

10. A loader as set forth in claim 9, wherein said backward shift mechanism comprises a bar and power chains for pulling the bar.

11. A loader as set forth in claim 9, wherein said backward shift mechanism comprises a pipe and power chains for pulling the pipe.

12. A loader as set forth in claim 9, wherein said pick-up mechanism comprises a plurality of pivotal joints.

13. A loader as set forth in claim 9, wherein said pick-up mechanism comprises only two pivotal joints.

14. A loader as set forth in claim 9, wherein said pick-up mechanism comprises a pivotal joint adapted to pivot greater than 180 degrees to rotate the pick-up mechanism from near the front end of the vehicle toward the back end of the vehicle.

15. A loader as set forth in claim 9, wherein said pick-up mechanism comprises a pivotal joint adapted to pivot about 220 degrees to rotate the pick-up mechanism from near the front end of the vehicle toward the back end of the vehicle.

16. A loader as set forth in claim 9, wherein said forward shift mechanism comprises a tab extending up from the bed and adapted to push bales longitudinally forward on the bed.

17. A method for loading and stacking big bales comprising:

a. picking up a first bale with a pick-up mechanism;
   b. rotating the pick-up mechanism vertically to place the first bale on a bed connected to a vehicle;
   c. releasing the first bale from the pick-up mechanism;
   d. rotating the pick-up mechanism vertically to pick up a second bale;
   e. actuating a forward shift mechanism on or in said bed to move said first bale to a position on the bed forward beyond where it was when said first bale was first placed on said bed;
   f. rotating the pick-up mechanism to place said second bale on top of said first bale; and
   g. actuating a backward shift mechanism to move said first and second bales toward a back end of the bed.

18. A method as set forth in claim 17, wherein the pick-up mechanism is rotated greater than 180 degrees to place the first bale on the bed.

19. A method as set forth in claim 17, wherein the pick-up mechanism is rotated about 220 degrees to place the first bale on the bed.

20. A method for loading and stacking big bales comprising:

a. picking up a first bale with a pick-up mechanism;
   b. rotating the pick-up mechanism vertically greater than 180 degrees to place the first bale on a bed connected to a vehicle;
   c. releasing the first bale from the pick-up mechanism;
   d. rotating the pick-up mechanism vertically to pick up a second bale;
   e. rotating the pick-up mechanism to place said second bale on top of said first bale; and
   f. actuating a backward shift mechanism to move said first and second bales toward a back end of the bed.

* * * * *